UNITED STATES PATENT OFFICE.

BENJAMIN DeNISE, OF CAMDEN, NEW JERSEY.

COMPOUND FOR WATERPROOFING AND PRESERVING BUILDINGS.

SPECIFICATION forming part of Letters Patent No. 295,525, dated March 25, 1884.

Application filed February 21, 1884. (No specimens.)

*To all whom it may concern:*

Be it known that I, BENJAMIN DeNISE, a citizen of the United States, residing at 224 Roydon street, Camden, Camden county, New Jersey, have invented a new and useful Improved Compound for Waterproofing and Preserving Buildings, of which the following is a full, clear, and exact description, which will enable others skilled in the art to which it appertains to make and use the same.

This compound, which consists of fossil wax, carnauba-wax, refined paraffine-oil, and carbolic acid, united by heat, I apply to the surface of brick or stone walls. The bricks are first heated, that the compound may be the more readily absorbed into the pores.

My water-proof compound consists of the following materials, united as described: I take of fossil wax, (this is a mineral wax known as well by "ozocerite,") sixteen pounds; carnauba-wax, four pounds, heat them together until the mixture becomes thoroughly clear, then add ten pounds of refined paraffine-oil, two pounds of carbolic acid, and apply heat until all unite in a fluid state.

The compound is applied as follows: A small part of the wall or face of the building is first heated by means of a furnace, as is customary in burning off paint. The compound, being in a fluid state, is then applied by a brush to the bricks, and if any are too cold to absorb the fluid, additional heat is applied by the furnace.

I claim—

1. The within-described waterproofing compound, consisting of fossil wax, carnauba-wax, refined paraffine-oil, and carbolic acid, united by heat.

2. The within-described waterproofing compound, consisting of fossil wax, carnauba-wax, refined paraffine-oil, and carbolic acid, combined in about the proportions and in the manner specified.

BENJAMIN DeNISE.

Witnesses:
JOSEPH CHAPMAN,
JOHN F. GRANT.